United States Patent [19]

Bickl et al.

[11] 4,152,068

[45] May 1, 1979

[54] METHOD AND APPARATUS FOR EVALUATING DEVELOPED PHOTOGRAPHIC FILMS PRIOR TO COPYING

[75] Inventors: Horst Bickl, Pullach; Günter Findeis, Sauerlach; Helmut Treiber; Wolfgang Zahn, both of Munich, all of Fed. Rep. of Germany

[73] Assignee: Agfa-Gevaert Aktiengesellschaft, Leverkusen, Fed. Rep. of Germany

[21] Appl. No.: 740,033

[22] Filed: Nov. 8, 1976

[30] Foreign Application Priority Data

Nov. 18, 1975 [DE] Fed. Rep. of Germany ....... 2551800

[51] Int. Cl.² ............................................. G03B 27/78
[52] U.S. Cl. ....................................... 355/38; 355/68; 355/77
[58] Field of Search ............... 355/38, 35, 83, , 67–69, 355/71, 88, 77, 41

[56] References Cited

U.S. PATENT DOCUMENTS

| | | | |
|---|---|---|---|
| 3,768,903 | 10/1973 | Steinberger et al. | 355/41 |
| 3,829,214 | 8/1974 | Zahn et al. | 355/83 |
| 3,947,110 | 3/1976 | Yamada | 355/88 |
| 3,963,344 | 6/1976 | Hujer et al. | 355/83 |

Primary Examiner—Hix. L. T.
Assistant Examiner—W. J. Brady

Attorney, Agent, or Firm—Peter K. Kontler

[57] ABSTRACT

Successive frames of a web of photographic color film are subjected to objective examination during transport through an automatic evaluating circuit which may constitute a discrete prereader or a prereader which is integrated into a copying machine upstream of the copying station. The prereader furnishes signals which represent color and/or density correction data for reproduction of those film frames which can be properly copied only with a setting of exposure controls which deviates from the average setting for copying of the majority of film frames. The objective examination of all film frames is followed by a subjective examination which is performed by an attendant who inspects at least some of those film frames whose examination by the prereader resulted in the generation of correction signals. The attendant inspects the film frames at the copying station or at a second station which is located immediately downstream of a discrete prereader, and the attendant simultaneously observes the corresponding correction signals which are furnished by the evaluating circuit and are displayed close to the copying station or in register with film frames at the second station. The attendant can approve, modify or cancel the correction signals, and can also initiate the generation of additional signals, e.g., to identify those film frames which are unfit for copying.

31 Claims, 2 Drawing Figures

METHOD AND APPARATUS FOR EVALUATING DEVELOPED PHOTOGRAPHIC FILMS PRIOR TO COPYING

BACKGROUND OF THE INVENTION

The present invention relates to a method and apparatus for evaluating exposed and developed film frames or analogous portions of information which is stored on elongated web-like carriers, especially for evaluating frames of exposed and developed color films prior to reproduction of such frames as a copying station. More particularly, the invention relates to a method and apparatus for selecting, storing and transmitting appropriate data to the exposure controls of a copying machine wherein portions of information which is stored on a web-like carrier are reproduced on photographic copy paper or other copying material.

Automatic copying machines for color photographic negatives are often, and particularly invariably, equipped with automatic (objective) evaluating systems which generate signals whenever the color balance and/or density of a frame is such that the exposure controls must be adjusted if the copying machine is to make an acceptable reproduction. The objective evaluating system scans each frame of a succession of frames on a web of color film and produces signals whenever the color balance and/or density of a frame deviates from an average value. The signals reach the exposure controls of the copying machine simultaneously with advancement of the respective frames into register with the copying station. The objective evaluating system can be installed in the copying machine proper so that it examines or inspects that frame which is already located at the copying station. Alternatively, the objective evaluating system can be installed ahead of the copying station and is then operatively connected with the exposure controls so as to insure that the signals reach the exposure controls simultaneously with the arrival of corresponding frames at the copying station.

It is further known to design the objective evaluating system as a discrete apparatus through which an entire web or a series of webs of photographic film advance upstream or ahead of the copying machine. Such apparatus are known as prereaders, and they are often equipped with means for determination and recording of certain other characteristics of film frames, e.g., lack of sharpness, failure to expose on or more frames, and/or others. The signals which are furnished by the prereader are stored on a suitable data carrier, e.g., a perforated tape, a magnetic tape or a magnetic disk. The data carrier is then introduced into the copying machine and the data which are stored thereon are decoded and transmitted to the exposure controls in synchronism with the placing of corresponding film frames into register with the copying station. The provision of a separate prereader exhibits the advantage that the evaluation of frames on a web of photographic film need not be synchronized with the reproduction of images of film frames in the copying machine. The integration of a prereader into the copying machine also exhibits certain advantages, especially that the means for storing data which must be transmitted to the exposure controls is simpler and more compact because it normally suffices to store data pertaining to a relatively small number of successive film frames.

The copying of color photographic negatives is normally carried out as follows: The integral color densities are measured at the copying station in the customary way. The results of such measurements are transmitted to the exposure controls, together with data from the prereader (such data are normally indicative of necessary density or color corrections when the tonal distribution and/or density of the respective frames deviates from an average value). The exposure controls then determine the exposure times in the three basic colors (red, blue and green).

It has been found that automatic prereaders of presently known design cannot insure the making of satisfactory reproductions of each and every frame on a relatively long web of photographic film. The reasons for such unreliability of prereaders are manifold. For example, these components of a prereader which monitor the density of the film frames often transmit signals for adjustment of the exposure controls so as to carry out a density correction even though the density of the respective film frame is quite satisfactory. This is due to the fact that a density correction is warranted only if this results in improved reproduction of an essential or dominant portion or section of a film frame. Correction of density in one or more secondary or non-essential portions or sections of the reproduced film frame often affects the quality of the reproduction because the density of the critical section deviates from satisfactory density. The prereader cannot discriminate between critical or dominant and secondary portions of a film frame even if the frame is subdivided into two or more imaginary areas or fields one of which is assumed to be (or to be likely to be) the dominant field. Reference may be had to commonly owned U.S. Pat. No. 3,523,728 granted Aug. 11, 1970 to R. Wick et al. In accordance with the teaching of this patent, the density of the dominant field of the frame is monitored independently of the secondary field or fields. A fully automatic prereader cannot properly evaluate the film frames according to imaginary or theoretical division into several fields of different importance, mainly because the dominant field is not always located in the same position especially since certain frames are exposed with the camera held in upright position and other frames are exposed with the camera held in horizontal positon or another position of inclination with respect to vertical.

As regards the color correction components of an automatic prereader, they are likely to select excessive or insufficient color correction values. This will be readily appreciated by considering that an automatic prereader cannot discriminate between intentional dominant colors and an unintentional color shade. For example, a vacationer is likely to make a large number of exposures on the beach where the blue color of the sky is predominant. An automatic prereader will invariably produce signals for excessive color correction of corresponding reproductions, i.e., the reproductions will be quite unsatisfactory. The same applies for exposures with a predominance of green (pictures of meadows, forests, etc.), grey (pictures of rocky mountains) and/or other colors.

OBJECTS AND SUMMARY OF THE INVENTION

An object of the invention is to provide a novel and improved method of reliably evaluating the condition of each and every discrete portion of information on an elongated carrier prior to reproduction of the information.

Another object of the invention is to provide a novel and improved method of objectively and subjectively evaluating the frames of a web of photographic film prior to copying of the film frames.

A further object of the invention is to provide a method of the just outlined character according to which the subjective evaluation of film frames does not result in appreciable delays but invariably reduces the number of unsatisfactory reproductions.

An additional object of the invention is to provide a method which insures that repeated copying of film frames can be eliminated or reduced to a fraction of the number of film frames which must be recopied when the frames are evaluated in accordance with heretofore known techniques.

Still another object of the invention is to provide a method which can be practiced by resorting to self-supporting (discrete) prereaders or to prereaders which are integrated into a copying machine.

A further object of the invention is to provide an apparatus for the practice of the above outlined method.

Another object of the invention is to provide an apparatus which can be used in or on conjunction with a copying machine to eliminate the need for the making of second prints or to reduce the number of frames which must be copied again to a minute fraction of those which must be copied in copying machines embodying or cooperating with conventional prereaders.

One feature of the invention resides in the provision of a method of processing discrete portions of information on a web-like carrier (particularly discrete frames of an exposed and developed photographic color film) prior to reproduction of such information at a copying station in a copying machine. The method comprises the steps of subjecting each portion of information on the carrier to an objective examination (namely, to examination by an evaluating circuit or the like) and producing at least one correction signal (pertaining to the density and/or tonal distribution of the respective portion of information) for each portion whose reproduction (based on the objective examination) necessitates a departure from the mode of reproducing the majority of portions at the copying station, subjecting at least some of those portions whose objective examination resulted in the generation of correction signals to a subjective examination (i.e., to visual inspection by an attendant), modifying (i.e., altering or erasing) each correction signal which, based on subjective examination of the respective portion, deviates from an appropriate signal for optimum reproduction of the respective portion, and utilizing the modified and unmodified correction signals for reproduction of the respective portions at the copying station. The step of subjective examination preferably includes displaying the correction signals in appropriate form and illuminating the respective portions of information for visual observation by the person who is in charge of performing the subjective examination. The step of objective examination preferably includes illuminating successive portions of information on the carrier.

The method preferably further comprises the step of producing additional signals which, based on visual observation of illuminated portions and of the corresponding correction signals, are needed for treatment of the respective portions at the copying station. Such additional signals may denote those portions which are unfit for reproduction and the additional signals are preferably used to prevent the copying of correponding portions.

The method preferably further comprises the steps of comparing the correction signals with a predetermined range of signals and subjecting to subjective examination only those portions of information whose objective examination resulted in the generation of correction signals which are outside of the predetermined range. This results in a substantial reduction of the number of portions which require subjective examination.

In accordance with a first presently preferred embodiment of our method, the step of subjective examination is performed at the copying station immediately preceding the reproduction of respective portions. Such embodiment of the method further comprises the steps of transporting the carrier stepwise at predetermined intervals (e.g., 2-3 portions per second) to place successive portions of information into register with the copying station, and prolonging the interval of dwell (at the copying station) of each such portion of information which is subjected to subjective examination. This embodiment of the method preferably further comprises the step of manually generating a signal for renewed transport of the carrier upon completion of each subjective examination or of automatically resuming the transport of the carrier when the duration of the interval of dwell reaches a predetermined value (e.g., one second).

In accordance with a second presently preferred embodiment of the method, the step of subjective examination includes simultaneously illuminating a group of successive portions of information on the carrier at a second station which is located ahead of the copying station and at the same time displaying the correction signals for the portions of the groups for visual observation of illuminated portions and of the displayed signals by the person who is in charge of performing the subjective examination. Such embodiment of the method further comprises the step of transporting the carrier stepwise to advance successive groups of portions to the second station.

The just discussed second embodiment of the method preferably further comprises the steps of comparing each displayed correction signal with a range of signals and restricting to subjective examination only those portions of information whose objective examination resulted in the generation of correction signals which are outside of the predetermined range. This facilitates the task of the person who is in charge of performing the subjective examination by reducing the number of those portions in a group which must be examined by such person. The person in charge can produce additional signals which, based on subjective examination, are appropriate for satisfactory processing of corresponding portions at the copying station; such additional signals may denote portions of information which are unfit for reproduction, and the additional signals are preferably used to prevent the reproduction of corresponding portions.

The second embodiment of our method preferably further comprises the step of storing the correction signals on magnetic tape or the like and transferring the stored signals into the copying machine for decoding simultaneously with the arrival of corresponding portion into register with the copying station. This second embodiment of our method can be practiced by resorting to a discrete prereader which is operated independently of the copying machine. The first embodiment of the method can be practiced with a prereader which is preferably integrated into the copying machine.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
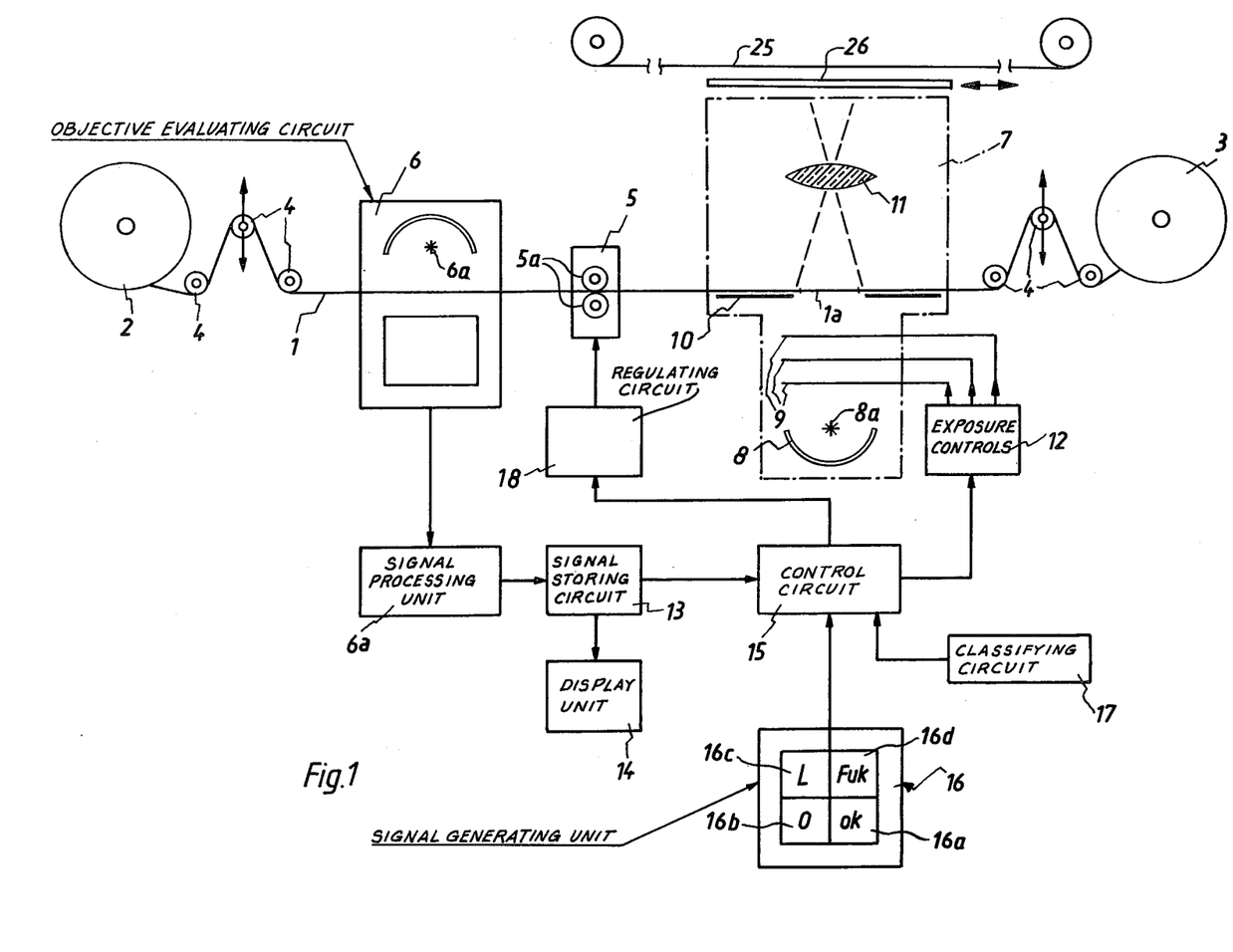
FIG. 1 is a diagrammatic view of an apparatus for objective evaluation of all film frames ahead of the copying station and for subjective examination of certain film frames at the copying station.

FIG. 1 shows a copying machine wherein subjective examination of certain frames of a web 1 of a photographic color film takes place at the copying station CS. The web 1 is stored in the form of a coil which constitutes a supply reel 2 and is trained over guide rolls 4, advanced or transported by two driven rolls 5a, trained over additional guide rolls 4, and collected by a takeup reel 3. A frame 1a of the web 1 is shown at the copying station CS in register with the means for reproducing its image onto a sheet of photographic paper 25. The reproducing means includes an imaging lens 11, three shutters (filters) 9, a diaphragm 10, a light source 8a, a reflector 8, and exposure controls 12 which effect movements of shutters 9 to and from the light-intercepting positions.

The web 1 is assumed to consist of a large number of exposed and developed photographic color films which are spliced together, end-for-end, in a manner customary in connection with transport of films through a developing machine. On their way from the supply reel 2 toward the copying station CS, successive frames 1a of the web 1 pass through an objective evaluating circuit 6 of known design wherein the frames are illuminated (see the light source 6A) and scanned to determine whether or not they must be reproduced with density and/or color control. The corresponding correction signals are transmitted to a suitable signal processing unit 6a which transmits signals to a storing circuit 13. The latter stores the signals until the corresponding film frames 1a reach the copying station CS. The signal storing circuit 13 has a first output which transmits signals to a display unit 14 adapted to be observed by an attendant simultaneously with inspection of the film frame 1a at the station CS.

A second output of the storing circuit 13 is connected with a control circuit 15 which is connected to the exposure controls 12, to the prime mover means 5 which transmits torque to one or both transporting or advancing rolls 5a, to a signal generating unit 16, and to a classifying circuit 17. The signal generating unit 16 can include or constitute a control panel or keyboard with several signal generating elements in the form of pushbuttons or knobs 16a, 16b, 16c, 16d. The reference character 7 denotes the copying or reproducing unit of the copying machine, i.e., that unit which defines the station CS and includes the components 8, 8a and 9–12. The placing of advancing rolls 5a between the objective evaluating circuit 6 and the copying unit 7 is advantageous and desirable because this enables the rolls 5a to place successive frames 1a into accurate register with the copying station CS.

In conventional copying machines with integrated prereaders, the signal storing circuit 13 is directly connected with the exposure controls 12 to transmit appropriate signals as soon as the respective frames 1a reach the copying station CS. In accordance with the present invention, the transmission of signals from the signal storing circuit 13 to the exposure controls 12 is preceded, at least in some instances, by a subjective examination or evaluation of the film frames 1a whereby the attendant either permits or prevents signals to pass from the storing circuit 13 to the exposure controls 12, depending upon the results of subjective examination of the film frame or frames. The purpose of subjective examination of at least some film frames 1a (preferably those which have caused the objective evaluating circuit 6 to transmit color and/or density correction signals to the signal storing circuit 13 via signal processing unit 6a) is to determine whether or not the circuit 6 has properly evaluated the film frames 1a, i.e., whether or not the generation of color and/or density correction signals by the objective evaluating circuit 6 was actually necessary and/or sufficiently accurate to insure the making of acceptable reproductions.

The frame 1a which is in register with the copying station CS is illuminated, e.g., by the light source 8a (but with the photosensitive sheet 25 shielded from light by a shutter 26) simultaneously with the exhibition of correction signals in the display unit 14. This enables the person in charge to observe the film frame 1a and to inspect the information which is displayed at 14. If the displayed information is satisfactory, the attendant permits the copying unit 7 to reproduce the image of the frame 1a at the station CS with correction data which the exposure controls 12 receive from the signal storing circuit 13, i.e., with data which are observable in the display unit 14. If the attendant feels that the correction signal furnished by the objective evaluating circuit 6 are not satisfactory, the signals which are stored in the circuit 13 for the film frame 1a at the copying station CS are erased or modified by the attendant who depresses one or more signal generating elements or knobs on the control panel 16. The arrangement may be such that, if the correction signals furnished by the objective evaluating circuit 6 are satisfactory, the attendant actuates a knob or the like to initiate the making of a print of the film frame 1a at the copying station CS or the attendant simply allows a certain interval of time (e.g., one second) to elapse whereby the copying unit 7 automatically proceeds with the reproducing operation. If the attendant decides to alter or erase the correction signals which have been furnished by the objective evaluating circuit 6, the copying of film frame 1a at the station CS can begin automatically after elapse of a preselected interval of time which is long enough to enable the attendant to modify or erase one or all correction data for the film frame 1a at the station CS.

The manner in which the correction data are displayed at 14 can be selected at will. For example, the unit 14 can display plus-minus signals for density and/or color correction, or the unit 14 can display discrete values for positive or negative correction of one or more parameters which must be considered in order to make a satisfactory reproduction. In the latter instance, the unit 14 can be designed to provide an alphanumeric display of correction signals.

It is not necessary to subject each and every frame 1a of the web 1 to a subjective examination. This would unduly prolong the copying operation and would contribute very little or nothing at all to proper reproduction of a large majority of film frames. As a rule, the attendant at the station CS requires approximately one second (or slightly less) for reliable subjective examination of the quality of film frame 1a at the copying station CS as well as for simultaneous observation of data which are displayed at 14. On the other hand, a modern copying machine is capable of making 2–3 reproductions per second. Therefore, it is presently preferred to subject to subjective examination only those film frames 1a whose objective evaluation by the circuit 6 resulted in the transmission of one or more correction signals to the processing unit 6a and of appropriate data from the unit 6a to the signal storing circuit 13. All other film frames 1a are transported and copied in the same way as in any conventional copying machine without a prereader.

In order to further reduce the number of film frames 1a which are to be subjected to subjective examination at the copying station CS, the prereader of FIG. 1 is provided with the classifying circuit 17 which transmits to the control circuit 15 signals representing the threshold values of correction data; if the intensity of signals transmitted to the control circuit 15 from the storing circuit 13 exceeds or is below the range of reference signals transmitted by the classifying circuit 17, the circuit 15 arrests the prime mover 5 for an interval of time (e.g., one second) which is long enough to enable the attendant to examine the film frame 1a at the station CS. This can be achieved by causing the circuit 15 to automatically initiate the illumination of the frame 1a at the station CS by the light source 8a (while the shutter 26 shields the photosensitive sheet 25), i.e., the attendant is made aware of the fact that the evaluating circuit 6 has determined that the film frame 1a at the station CS must be copied with a very pronounced departure of adjustment of exposure controls 12 from that adjustment which is needed for the copying of an average film frame. It will be seen that the circuit 17 enables the control circuit 15 to classify the correction signals according to intensity and thus insures that the normal copying process is modified (decelerated) only when the signals furnished by the objective evaluating circuit 6 deviate considerably from the range of reference signals. For example, the control circuit 15 will cause the light source 8a to illuminate a film frame 1a only when the intensity of a density correction signal furnished by the circuit 6 is well above or below a preselected range of density signals and/or when the intensity of a color correction signal is indicative of an unusual distribution or ratio of the basic colors. The knobs on the control panel 16 enable the attendant to erase the correction signals which are furnished by the evaluating circuit 6, to modify such signals, or to confirm such signals. Furthermore, the attendant can initiate the generation of an additional signal, preferably a so-called "exprint" signal, if the frame 1a at the station CS is totally unsatisfactory so that it is not fit for copying. The "exprint" signal prevents the unit 7 from making a copy of such frames, i.e., the frame is simply advanced beyond the station CS.

Experiments have shown that the number of film frames 1a on a relatively long web 1, consisting of a substantial number of spliced-together exposed and developed photographic color films, which must be copied again owing to improper regulation of exposure controls 12 by the objective evaluating circuit 6 is between 8 and 10 percent of the total number of film frames. In other words, the objective evaluating circuit 6 is reliable in nine out of ten cases. By resorting to the method of the present invention, i.e., by subjecting to subjective examination those film frames whose evaluation by the circuit 6 resulted in the generation of one or more correction signals, the number of unsatisfactory reproductions can be reduced to zero or to a small fraction of one percent. This results in substantial savings in time, cost for labor and cost for photographic paper because the number of frames which must be copied for a second time (because the first copies were unsatisfactory) is negligible or zero. The savings in time due to elimination of the need for the making of second copies of approximately ten percent of film frames more than compensate for the time which is spent by the attendant to examine those film frames whose evaluation by the circuit 6 resulted in the generation of correction signals. Another important advantage of the improved method and apparatus is that the number of customer complaints is greatly reduced or that the customer complaints are not received at all because a renewed (subjective) inspection of film frames whose inspection by the circuit 6 resulted in the generation of correction signals (or of correction signals whose intensity is outside of the range or ranges selected by the classifying circuit 17) practically insures that each and every film frame will be reproduced with an optimum setting of exposure controls 12.

The fact that losses in time due to subjective evaluation of approximately ten percent of film frames 1a (or less if the apparatus of FIG. 1 includes the classifying circuit 17) are negligible (especially when one considers that the number of second prints is or can be reduced to zero) will be readily appreciated by assuming that the copying machine is set to make three copies per second and that one second is needed for visual inspection of a frame 1a and of pertinent data in the display unit 14. If the number of film frames which must be copied with one or more correction factors is 10 percent of the overall number, the copying of 3,000 frames takes up 1,200 seconds instead of 1,000. The making of 300 second prints takes up several times 200 seconds and involves additional expenditures in energy and photographic paper.

The construction of the objective evaluating circuit 6, of the signal processing unit 6a and of the signal storing circuit 13 is known in the art of prereaders for copying machines. Signals which are stored in the circuit 13 represent (in approximately 90 percent of the cases) proper correction data or factors for transmission to the exposure controls 12 and (in the remaining 10 percent of cases) improper correction data or factors which are either amended or erased by the attendant in response to actuation of appropriate pushbuttons on the control panel 16. As mentioned above, the display unit 14 may exhibit the correction signals in the form of plus-minus signals or in the form of discrete numerical values. The unit 14 displays the signals simultaneously with arrival of the respective film frame 1a at the copying station CS.

The pushbuttons 16a–16d on the control panel 16 include an "OK" button 16a which is actuated if the attendant has determined that correction signals furnished by the objective evaluating circuit 6 are acceptable. The machine then immediately proceeds with the copying of the film frame 1a at the station CS. The pushbutton 16b is provided with a symbol "O" and is actuated when the attendant decides to cancel the correction signals furnished by the objective evaluating circuit 6. The machine then proceeds to copy the respective film frame without any correction factors, i.e., in the same way as the majority of film frames. The pushbutton 16c is provided with a symbol "L" and is actuated when the attendant decides that the film frame 1a at the station CS is not worthy of copying, i.e., this also amounts to an overriding of signals which are furnished by the evaluating circuit 6 plus an immediate transport of the respective film frame beyond the copying station CS. The pushbutton 16d is provided with a symbol "FUK" and is actuated when the attendant determines that the respective film frame 1a exhibits a dominant color, i.e., that the color correction signal furnished by the evaluating circuit 6 must be modified in order to insure that the reproduction of the respective frame will also exhibit a dominant color.

The classifying circuit 17 is preferably adjustable so that it can furnish signals which are indicative of different ranges of acceptable or average correction data. As mentioned above, the circuit 17 renders it possible to further reduce the delays which are due to subjective examination of certain film frames by insuring that the speed of the copying machine is reduced below the normal operating speed only when the intensity of signals furnished by the objective evaluating circuit 6 for modified exposure of certain film frames 1a is outside of the range determined by the setting of the classifying circuit 17.

An output of the control circuit 15 is connected with a regulating circuit 18 for the prime mover 5 which drives one or both transporting or advancing rolls 5a for the web 1. The just mentioned output of the control circuit 15 transmits a signal in immediate response to actuation of one of the pushbuttons 16a–16d on the control panel 16. Furthermore, the just mentioned output transmits a go-ahead signal after elapse of a preselected interval of time (e.g., one second) which is required for reliable subjective examination of a film frame 1a at the copying station CS.

The exposure controls 12 regulate the operation of the shutters 9, one for each of the three primary colors. For example, one of the shutters 9 may constitute a yellow filter, another shutter a purple filter and the third shutter a blue-green filter.

In accordance with a second embodiment of the invention, the improved method can be practiced by resorting to discrete prereaders which are not integrated into copying machines. Presently known prereaders include manually operated as well as automatic apparatus. In a manually operated prereader, the attendant inspects each and every frame on a web of photographic film and actuates the keys on a keyboard or the like to produce signals which must be transmitted to the exposure controls for copying of the respective film frames. The attendant examines each frame to determine the density, the color balance as well as whether or not the frame is susceptible of being reproduced (i.e., whether or not it is worth to make a copy). The signals which are produced by the attendant are encoded, stored and transmitted to the exposure controls at appropriate times, i.e., when the respective film frames reach the copying station. As a rule, the information is stored on a tape or disk and the carrier of such information is introduced into the copying machine together with the corresponding web of film frames. The copying machine includes an automatic reader which decodes the information and transmits it to the exposure controls.

The just described manually operated prereaders are outdated for use in the majority of modern photographic processing laboratories because visual inspection of each film frame and manual encoding of pertinent data takes up too much time to guarantee an economical operation of the copying machine. Moreover, the inspection of each and every film frame is a tedious and tiresome task which must be performed by highly skilled attendants. An attendant who is in charge of examining each and every frame of each of a series of successive webs of photographic film must be relieved at frequent intervals if he or she is to perform the task satisfactorily. Moreover, the encoding of information on tapes or disks and the transport of such disks or tapes into the copying machine, together with the respective rolls of convoluted webs of photographic film, is expensive and cumbersome.

Automatic prereaders which are not integrated into copying machines overcome many drawbacks of manually operated prereaders. However, they also exhibit the aforediscussed drawbacks of prereaders which are integrated into copying machines, i.e., that one out of ten film frames will be copied with less than satisfactory setting of exposure controls. An automatic prereader embodies an objective evaluating circuit which is similar to or identical with the circuit 6 of FIG. 1 and means for storing the signals which are transmitted by the objective evaluating circuit. The signal storing means includes a tape or a disk and is transferred into the copying machine together with the respective web of photographic film. The stored information is decoded by a reader which transmits signals to the exposure controls in synchronism with transport of the corresponding film frames into register with the copying unit.

In accordance with the second embodiment of our invention, objective evaluation of successive film frames 1a of a web 1 in an automatic prereader (FIG. 2) is followed by subjective examination of certain film frames in order to check the accuracy of objective evaluation and to enable the attendant to erase or modify correction signals which are furnished by the automatic prereader. As described in connection with the embodiment of FIG. 1, a subjective examination may involve the inspection of each and every film frame whose evaluation by the automatic prereader has resulted in the generation of one or more correction signals (for density and/or color balance) or the inspection of those film frames whose evaluation by the automatic prereader resulted in the generation of signals with an intensity which is outside of a predetermined range. The latter procedure is preferred at this time because the number of film frames which require subjective examination is reduced to a small fraction of ten percent of the overall number of film frames.

Figure 2:
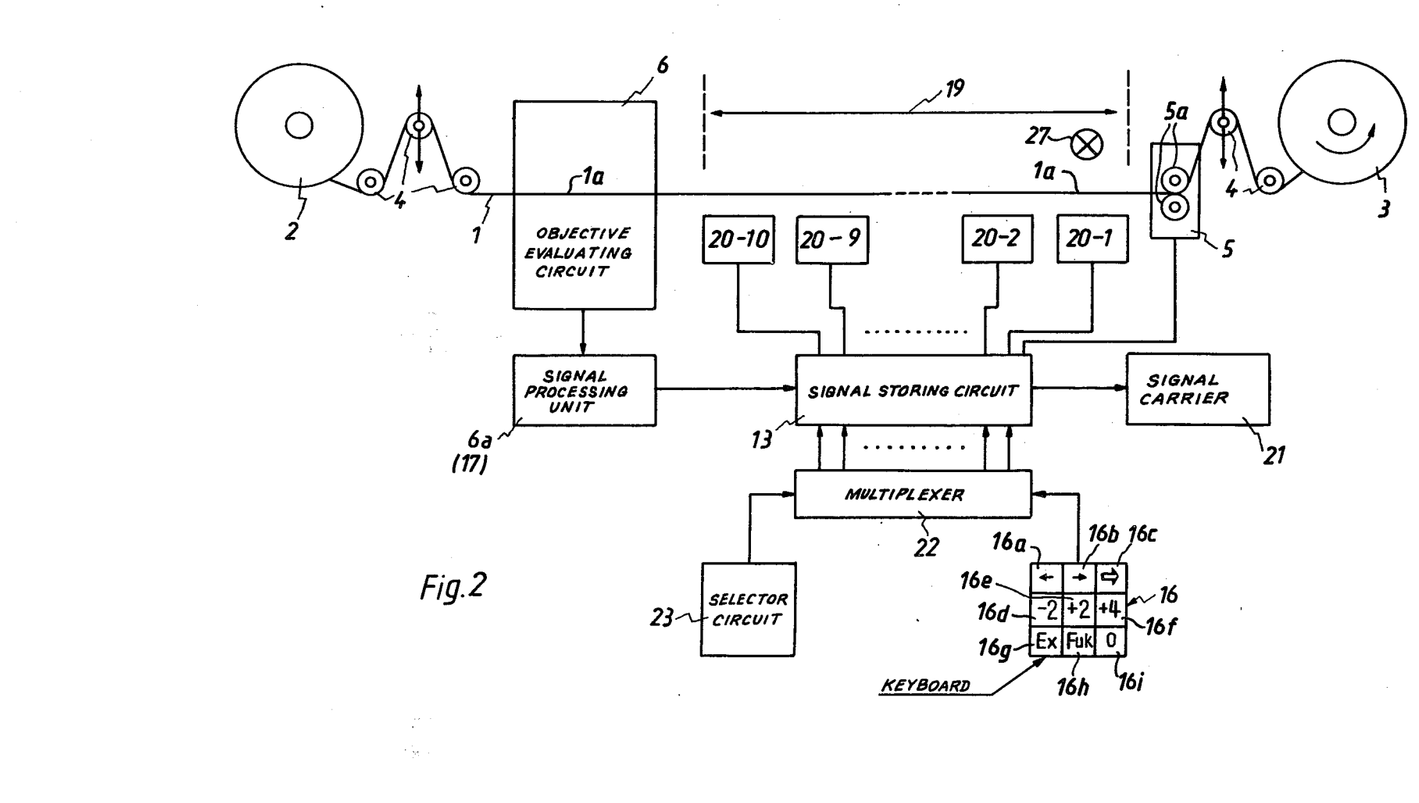
FIG. 2 is a diagrammatic view of an apparatus for subjecting film frames to objective evaluation and subjective examination ahead of the copying station.

All such parts of the structure shown in FIG. 2 which are identical with or clearly analogous to corresponding parts of the structure shown in FIG. 1 are denoted by similar reference characters. The web 1 is stored on a supply reel 2 and is trained over two sets of guide rolls 4 on its way to the takeup reel 3. The prime mover 5 drives one or both advancing or transporting rolls 5a which are located close to the guide rolls 4 preceding the takeup reel 3. The circuit 6 of the prereader evaluates each and every frame 1a of the web 1 and transmits signals to a signal processing unit 6a which transmits signals to the storing circuit 13. The unit 6a of FIG. 2 can perform the function of the classifying circuit 17 in the apparatus of FIG. 1. The reference character 19 denotes a second station where a set or group of n (say ten) film frames is subjected to visual examination by an attendant. The rolls 5a transport the web 1 stepwise through the objective evaluating circuit 6 and thereupon into the visual inspecting station 19. The n film frames 1a at the station 19 can be observed simultaneously. The prime mover 5 is arrested when the station 19 is occupied by n fresh film frames and the correction signals which were transmitted to the storing circuit 13 via unit 6a are made visible in or on the corresponding display units 20-1 to 20-10 (it being assumed that n equals ten) in proper alinement with the corresponding film frames at the station 19. As mentioned in connection with FIG. 1 for the display unit 14, each of the display units 20-1 to 20-10 can exhibit information in the form of plus-minus signals or in the form of discrete numerical values pertaining to correction (if any) of density and/or color balance. Information in the form of plus-minus signals is preferred in many instances because the attendant can readily spot that or those film frames whose evaluation by the circuit 6 resulted in the generation of signals indicating that the respective frame or frames must be copied in a manner which deviates from copying of the majority of frames. As a rule, the number of such frames at the station 19 will not exceed two. The interval of dwell of ten fresh film frames at the station 19 is selected in such a way that a skilled attendant has ample time to ascertain whether or not one or more frames are not fit for copying. The manner in which the film frames at the station 19 are illuminated so that they can be readily examined by the attendant is not shown in detail; FIG. 2 merely shows a single light source 27 behind the film frame 1a which is in register with the display unit 20-1. It has been found that a reasonably skilled attendant can determine, at a glance, whether or not a group of ten (or even more) consecutive film frames includes one or more frames which are not fit for copying.

A control panel 16 or keyboard with nine signal generating elements or keys 16a-16i is installed within reach of the attendant's hand to enable the attendant to initiate the generation of various signals which are transmitted to a multiplexer 22 which is connected to the signal storing circuit 13. The pushbutton 16b is depressed when the attendant determines that the correction signals (if any) for a film frame 1a at the station 19 are acceptable. The pushbutton 16a can initiate backward movement of the web 1. One or more pushbuttons 16d, 16e, 16f in the median row of pushbuttons on the control panel 16 will be depressed if the attendant decides to modify the signals furnished by the objective evaluating circuit 6. The pushbutton 16i is depressed if the attendant decides to erase or cancel the signal which has been furnished by circuit 6 for a particular film frame. The pushbutton 16h is depressed when the attendant determines that a film frame exhibits a dominant color, i.e., the depression of pushbutton 16h results in correction or elimination of the color correction signal from the evaluating circuit 6. The pushbutton 16g is depressed when a frame at the station 19 is not fit for copying. The circuit 13 transmits The signal to the prime mover 5 when the attendant has actuated at least one pushbutton for each and every film frame at the station 19. For example, and assuming that all film frames at the station 19 can be copied in the customary way, i.e., without any correction, the pushbutton 16b is depressed ten times and the last actuation of pushbutton 16b automatically initiates forward transport of the web 1 through a distance which suffices to place n fresh film frames into register with the display units 20-1 to 20-10 at the station 19. The signal storing circuit 13 is connected with a carrier 21 for modified and/or unmodified correction signals. Th carrier 21 may include a magnetic tape, a perforated tape or a magnetic disk which stores the information for decoding by an automatic reader in the copying machine. The information on the carrier 21 is decoded when the web 1 is introduced into the copying machine so that the exposure controls of the copying machine receive information whenever the corresponding film frame is in register with the copying unit. The arrangement is preferably such that the transfer of information from the storing circuit 13 to the carrier 21 take place simultaneously with starting of the prime mover 5 for the purpose of advancing ten fresh film frames into register with the display units 20-1 to 20-10.

The storing circuit 13 has n stages or compartments, one for each display unit, and each stage of the circuit 13 is connected with the respective display unit. The reference character 23 denotes a selector circuit which is connected with the multiplexer 22 and enables the attendant to pinpoint a particular film frame at the station 19, i.e., to establish a connection between that stage of the signal storing circuit 13 which is in register with a particular display unit when the group of frames at the station 19 includes a single frame which must be copied with correction data other than those furnished by the objective evaluating circuit 6. For example, the selector circuit 23 may include n keys, one for each display unit 20. When the attendant depresses a selected key of the circuit 23, the attendant simultaneously depresses one of the pushbuttons on the control panel 16 so that information pertaining to the corresponding film frame at the station 19 is stored in the appropriate stage of the circuit 13. The provision of selector circuit 23 is desirable and advantageous because it contributes to a reduction of the period of dwell of a set of n film frames at the station 19. As mentioned before, it is to be expected that only one or two of ten film frames require subjective inspection; therefore, the provision of selector circuit 23 results in substantial savings in time because the attendant spends only as much time as is necessary for introduction of signals from the control panel 16 into one or two stages of the storing circuit 13. The prime mover 5 is started, by way of the circuit 13, in response to depression of the pushbutton 16c. The actuation of pushbutton 16c results in simultaneous transfer of information from the n stages of the circuit 13 onto the carrier 21. When the entire web 1 is stored on the takeup reel 3, the latter is transferred into the copying machine and the carrier 21 is connected with a reader which transmits decoded information to the exposure controls of the copying machine.

As mentioned before, the exact details of the objective evaluating circuit 6 in the apparatus of FIG. 1 or 2 form no part of the invention. Such circuits are well known from the art of prereaders. However, and since at least some film frames of the web 1 are invariably subjected to a subjective examination, the circuit 6 may be simplified because the results of objective evaluation are examined by the attendant prior to transmission of corresponding data to the exposure controls. This applies in particular for those components of the evaluating circuit 6 which serve to furnish color correction signals, i.e., such components can be simplified because the distribution of colors in selected film frames of the web is examined by the attendant prior to copying and the attendant can override or cancel the corresponding correction signals which are furnished by the objective evaluating circuit.

The color correction involves a discrimination between the presence of a dominant tone and a color shade. The attendant normally inspects a film frame for color correction if the evaluating unit indicates the need for a correction factor which is quite different from an average correction factor, i.e., from a range of correction factors selected by a classifying circuit ($6a$ in FIG. 2). A simple method of detecting film frames with critical color balance ratios is to measure the three color densities of all film frames, to calculate the ratio of such densities and to compare the ratio with the average ratio of a very large number of film frames. Reference may be had to the commonly owned German patent application Ser. No. P 19 14 360.3. When the ratio which is determined by the objective evaluating circuit 6 deviates from an acceptable range of ratios, the attendant examines the respective film frame and decides whether or not the unusual ratio is attributable to the presence of a dominant color or to a color shade. If the ratio is attributable to the presence of a dominant color, the attendant depresses the pushbutton with the symbol "FUK" to insure the making of a satisfactory reproduction.

It is also possible to determine the color correction data in a number of other ways. For example, one determines the color ratio in several film frames and compares such ratio with the ratio of a much larger number of film frames. If the ratio of several frames grossly deviates from the ratio of a much larger number of frames, the deviation is attributable to an unsatisfactory color shade of the entire film or to the presence of a dominant color in several film frames (e.g., those which were exposed during vacation at a sea resort). The attendant will then decide to reduce the automatically furnished correction factor and will allow the copying with an unchanged correction factor only if the color shade of the entire film is unsatisfactory.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. A method of processing discrete portions of information on a web-like carrier, particularly discrete frames of an exposed and developed photographic film, prior to reproduction of such information at a copying station, comprising the steps of subjecting each portion of information on the carrier to an objective evaluation and producing at least one correction signal for each portion whose reproduction, based on said objective evaluation, necessitates a departure from the mode of reproducing the majority of portions at the copying station; subjecting at least one of those portions whose objective evaluation resulted in the generation of correction signals to a subjective examination, including displaying said correction signals and illuminating the respective portions of visual observation by the person performing the subjective examination; modifying each correction signal which, based on subjective examination of the respective portion, deviates from an appropriate signal for optimal reproduction of the respective portion; and utilizing the modified and unmodified correction signals for reproduction of the respective portions at the copying station.

2. A method as defined in claim 1, wherein said correction signals pertain to the density of the respective portions.

3. A method as defined in claim 1, wherein said carrier is a color film and said correction signals pertain to tonal distribution of the respective portions.

4. A method as defined in claim 1, wherein said step of objective evaluation includes illuminating successive portions of information on said carrier.

5. A method as defined in claim 1, further comprising the step of producing additional signals which, based on visual observation of illuminated portions and of the corresponding correction signals, are needed for treatment of the respective portions at the copying station.

6. A method as defined in claim 5, wherein said additional signals denote portions which are unfit for reproduction.

7. A method as defined in claim 1, wherein said step of subjective examination is performed at the copying station.

8. A method as defined in claim 7, further comprising the steps of transporting said carrier stepwise at predetermined intervals to place successive portions of information into register with the copying station, and prolonging the interval of dwell at the copying station of each such portion which is subjected to subjective examination.

9. A method as defined in claim 8, further comprising the step of manually generating a signal for renewed transport of said carrier upon completion of each subjective examination.

10. A method as defined in claim 8, further comprising the step of automatically resuming the transport of said carrier when the duration of said interval of dwell reaches a predetermined value.

11. A method of processing discrete portions of information on a web-like carrier, particularly discrete frames of an exposed and developed photographic film, prior to reproduction of such information at a copying station, comprising the steps of subjecting each portion of information on the carrier to an objective evaluation and producing at least one correction signal for each portion whose reproduction, based on said objective evaluation, necessitates a departure from the mode of reproducing the majority of portions at the copying station; comparing said correction signals with a predetermined range of signals; subjecting at least one of those portions whose objective evaluation resulted in the generation of correction signals to a subjective examination; modifying each correction signal which, based on subjective examination of the respective portion, deviates from an appropriate signal for optimum reproduction of the respective portion, including subjecting to said subjective examination only those portions whose objective evaluation resulted in the generation of correction signals outside of said range; and utilizing the modified and unmodified correction signals for reproduction of the respective portions at the copying station.

12. A method of processing discrete portions of information on a web-like carrier, particularly discrete frames of an exposed and developed photographic film, prior to reproduction of such information at a copying station, comprising the steps of subjecting each portion of information on the carrier to an objective evaluation and producing at least one correction signal for each portion whose reproduction, based on said objective evaluation, necessitates a departure from the mode of reproducing the majority of portions at the copying station; subjecting at least one of those portions whose objective evaluation resulted in the generation of correction signals to a subjective examination, including simultaneously illuminating a group of successive portions of information on said carrier at a second station ahead of the copying station and at the same time displaying the correction signals pertaining to the portions of said group for visual observation of illuminated portions and displayed signals by the person performing said subjective examination; transporting said carrier stepwise to advance successive groups of portions to said second station; modifying each correction signal which, based on subjective examination of the respective portion, deviates from an appropriate signal for optimum reproduction of the respective portion; and utilizing the modified and unmodified correction signals for reproduction of the respective portions at the copying station.

13. A method as defined in claim 12, further comprising the steps of comparing each displayed correction signal with a range of signals and restricting to subjective examination only those portions of information whose objective evaluation resulted in the generation of correction signals which are outside of said range.

14. A method as defined in claim 12, further comprising the step of producing additional signals which, based on said subjective examination, are appropriate for satisfactory processing of corresponding portions at the copying station.

15. A method as defined in claim 14, wherein said additional signals denote portions which are unfit for reproduction at the copying station.

16. Apparatus for processing discrete portions of information on a web-like carrier, particularly discrete frames of an exposed and developed photographic film, prior to reproduction of such information at the copying station of a copying machine, comprising evaluating means for subjecting each portion of information on the carrier to an objective examination, including means for producing at least one correction signal for each portion of information whose reproduction—based on the objective examination—necessitates a departure from the mode of reproducing the majority of portions at the copying station; means for transporting successive portions of information on said carrier into register with said evaluating means; means for storing said correction signals; means for modifying each correction signal which, based on subjective examination of the respective portion of information, deviates from an appropriate signal for optimum reproduction of the respective portion; and means for displaying the signals pertaining to those portions of information which are subjected to subjective examination so that the person in charge of performing said subjective examination can inspect at least one portion of information and the corresponding correction signal prior to actuating said signal modifying means.

17. Apparatus for processing discrete portions of information on a web-like carrier, particularly discrete frames of an exposed and developed photographic film, prior to reproduction of such information at the copying station of a copying machine, comprising evaluating means for subjecting each portion of information on the carrier to an objective examination, including means for producing at least one correction signal for each portion of information whose reproduction—based on the objective examination—necessitates a departure from the mode of reproducing the majority of portions at the copying station; means for transporting successive portions of information on said carrier into register first with said evaluating means and thereupon with said copying station; means for storing said correction signals; means for modifying each correction signal which, based on subjective examination of the respective portion of information, deviates from an appropriate signal for optimum reproduction of the respective portion; means for illuminating at said copying station at least some of those portions of information whose objective examination resulted in the generation of correction signals to allow for subjective examination of illustrated portions at said copying station prior to reproduction; and means for displaying the stored correction signals for the portions which are illuminated at said copying station.

18. Apparatus as defined in claim 17, wherein said modifying means comprises a plurality of manually operable signal generating elements.

19. Apparatus as defined in claim 18, wherein said modifying means further comprises control means receiving signals from said storing means and from said signal generating elements and arranged to effect the modification of correction signals in response to signals from said elements while the corresponding portions of information register with said copying station.

20. Apparatus as defined in claim 17, further comprising means for classifying said correction signals according to intensity and control means for actuating said illuminating means and said displaying means only when the intensity of a signal is outside of a predetermined range.

21. Apparatus as defined in claim 20, further comprising means for regulating the operation of said transporting means so as to prolong the period of dwell of a portion of information which is in register with said copying station when the intensity of the corresponding correction signal is outside of said range.

22. Apparatus for processing discrete portions of information on a web-like carrier, particularly discrete frames of an exposed and developed photographic film, prior to reproduction of such information at the copying station of a copying machine, comprising evaluating means for subjecting each portion of information on the carrier to an objective examination, including means for producing at least one correction signal for each portion of information whose reproduction—based on the objective examination—necessitates a departure from the mode of reproducing the majority of portions at the copying station; means for transporting successive portions of information on said carrier through said evaluating means and for locating successive groups of such portions at a second station; means for displaying the correction signals for the portions at said second station, said displaying means including a discrete unit for each portion of information at said second station; means for modifying each correction signal which, based on subjective examination of the respective portion of information, deviates from an appropriate signal for optimum reproduction of the respective portion; and means for illuminating the portions of information at said second station for visual observation by the person in charge of said subjective examination simultaneously with visual inspection of displayed correction signals.

23. Apparatus as defined in claim 22, wherein said evaluating means is a discrete prereader independent of said copying machine.

24. Apparatus as defined in claim 22, further comprising signal storing means connected with said evaluating means and said displaying units.

25. Apparatus as defined in claim 24, further comprising signal classifying means connected between said evaluating means and said signal storing means and arranged to classify correction signals according to intensity, said storing means being arranged to transmit to said displaying units those correction signals whose intensity is outside of a predetermined range.

26. Apparatus as defined in claim 22, wherein each unit of said displaying means includes means for exhibiting correction signals in the form of alphanumeric values.

27. Apparatus as defined in claim 22, wherein each unit of said displaying means comprises means for exhibiting correction signals in the form of plus-minus data.

28. Apparatus as defined in claim 22, further comprising signal storing means connected with said evaluating means and with said signal modifying means, and carrier means for modified and unmodified signals furnished by said storing means.

29. Apparatus as defined in claim 28, wherein said modifying means comprises a plurality of discrete manually operable signal generating elements and multiplexer means connecting said elements with said signal storing means, said signal storing means having a discrete stage for each portion of information at said second station and each connected to the corresponding unit of said displaying means, and further comprising selector means operable to connect said elements with selected stages of said storage means.

30. Apparatus as defined in claim 29, wherein said selector means is connected with said storing means by way of said multiplexer means.

31. Apparatus as defined in claim 28, wherein said elements include an element for generation of signals identifying those portions of information at said second station which, based on said subjective examination, are unfit for reproduction at said copying station.

* * * * *